US009460250B1

(12) United States Patent
Schutt-Aine et al.

(10) Patent No.: US 9,460,250 B1
(45) Date of Patent: Oct. 4, 2016

(54) SYSTEM, METHOD, AND COMPUTER PROGRAM PRODUCT FOR INPUT/OUTPUT BUFFER MODELING

(75) Inventors: Jose Emmanuel Schutt-Aine, Urbana, IL (US); Dennis Nagle, Peabody, MA (US); Feras Al-Hawari, Chelmsford, MA (US); Ambrish Kant Varma, Nashua, NH (US); Jilin Tan, Nashua, NH (US); Ping Liu, Shanghai (CN); Shangli Wu, New Providence, NJ (US); Yubao Meng, Shanghai (CN); Qi Zhao, Shanghai (CN); Zhongyong Zhou, Shanghai (CN)

(73) Assignee: Cadence Design Systems, Inc., San Jose, CA (US)

( * ) Notice: Subject to any disclaimer, the term of this patent is extended or adjusted under 35 U.S.C. 154(b) by 597 days.

(21) Appl. No.: 13/562,092

(22) Filed: Jul. 30, 2012

(51) Int. Cl.
G06F 17/50 (2006.01)

(52) U.S. Cl.
CPC .............................. G06F 17/5036 (2013.01)

(58) Field of Classification Search
CPC ................................................... G06F 17/5036
USPC ............................................................ 703/14
See application file for complete search history.

(56) References Cited

U.S. PATENT DOCUMENTS

| | | | | |
|---|---|---|---|---|
| 5,815,687 A * | 9/1998 | Masleid | ............. | G06F 17/5022 326/95 |
| 5,838,949 A * | 11/1998 | Hassoun | ............. | G06F 17/5022 703/13 |
| 6,466,898 B1 * | 10/2002 | Chan | .................. | G06F 17/5022 703/14 |
| 7,395,192 B2 * | 7/2008 | Kwon et al. | ...................... | 703/2 |
| 7,443,759 B1 * | 10/2008 | Rowlands | ............... | G11C 7/20 365/226 |
| 8,560,294 B1 * | 10/2013 | Ren et al. | ....................... | 703/14 |
| 2002/0188915 A1 * | 12/2002 | Hayes | .............................. | 716/4 |
| 2003/0188267 A1 * | 10/2003 | Lehner et al. | .................... | 716/1 |
| 2004/0254775 A1 * | 12/2004 | Muranyi | ........................ | 703/16 |
| 2006/0224374 A1 * | 10/2006 | Kwon et al. | .................... | 703/15 |
| 2007/0185699 A1 * | 8/2007 | Suwa et al. | .................... | 703/13 |
| 2012/0191437 A1 * | 7/2012 | Yoshimura et al. | ........... | 703/14 |

FOREIGN PATENT DOCUMENTS

| | | | |
|---|---|---|---|
| CN | 1808445 A | * | 7/2006 |
| CN | 102254073 A | * | 11/2011 |

OTHER PUBLICATIONS

IBIS Open Forum("IBIS Modeling Cookbook for IBIS Version 4.0", Sep. 2005, pp. 1-87).*

(Continued)

*Primary Examiner* — Omar Fernandez Rivas
*Assistant Examiner* — Iftekhar Khan
(74) *Attorney, Agent, or Firm* — Holland & Knight LLP; Mark H. Whittenberger, Esq.

(57) ABSTRACT

The present disclosure relates to a computer-implemented method for transient simulation of an input/output buffer model. The method may include generating an input/output buffer data file associated with a first model of an electrical circuit. The method may also include determining at least one of a node voltage and a branch current associated with the electrical circuit using, at least in part, a latency insertion method, the method may further include performing one or more simulations on a second model of an electrical circuit, the one or more simulations incorporating, at least in part, the input/output buffer data file and the latency insertion method.

15 Claims, 6 Drawing Sheets

(56) References Cited

OTHER PUBLICATIONS

Application Note ("An Introduction to IBIS (I/O Buffer Information Specification) Modeling", Texas Instruments, Literature No. SNLA046, 1998, pp. 1-6).*
Tehrani et al. ("Extraction of Transient Behavioral Model of Digital I/O Buffers from IBIS", Proceedings of 1996 ECTC Conference, 1996, pp. 1009-1015).*
José E. Schutt-Ainé hereafter Schutt-Ainé ("Latency Insertion Method (LIM) for the Fast Transient Simulation of Large Networks", IEEE, Jan. 2001, pp. 81-89).*
Inoue et al ("Fast Circuit Simulation Based on Parallel-Distributed LIM using Cloud Computing System", Journal of Semiconductor Technology and Science, vol. 10, No. 1, Mar. 2010).*
Patrick Kuanlye Goh ("A Fast Multi-Purpose Circuit Simulator Using the Latency Insertion Method", University of Illinois at Urbana-Champaign, 2012).*
Takayuki Watanabe ("A Fast Transient Simulation Strategy by Positively Utilizing On-Chip Inductance", University of Shizuoka).*
Ji et al. ("Evaluation of IBIS Modelling Techniques for Signal Integrity Simulations without and with Package Parasitics", IEEE, 2010, pp. 1-4—IDS).*
Therani et al. ("Extraction of Transient Behavioral Model of Digital I/O Buffers from IBIS", Proceedings of 1996 ECTC Conference, 1996, pp. 1009-1015-IDS).*
Chen, "IBIS Algorithm Including Reactive Loads," [online]. Asian IBIS Summit, Beijing, China, Sep. 11, 2007, [retrieved Sep. 27, 2012]. Retrieved from the Internet: <http://www.vhdl.org/pub/ibis/summits/sep07a/chen.pdf>, 12 pages.
Cuny, "SPICE and IBIS Modeling Kits the Basis for Signal Integrity Analyses," IEEE 1996 Symposium on Electromagnetic Compatibility, 1996, pp. 204-208.
Deng et al., "Stability analysis of latency insertion method (LIM)," in EPEP'04, Oregon, Poland, 2004, pp. 167-170.
Star-HSPICE Manual, Avant! Corporation and Avant! subsidiary, Release 1998.4, Jan. 1999, pp. 1-1870.
"I/O Buffer Information Specification (IBIS)," [online]. Version 2.1, Dec. 13, 1995, [retrieved Sep. 27, 2012]. Retrieved from the Internet: <http://eda.org/pub/ibis/ver2.1/ver2_1.txt>, 28 pages.
"IBIS Modeling Cookbook for IBIS Version 4.0," [online]. The IBIS Open Forum, Sep. 15, 2005, [retrieved Sep. 27, 2012]. Retrieved from the Internet: <http://www.eda.org/ibis/cookbook/cookbook-v4.pdf>, pp. 1-87.
IBIS (I/O Buffer Information Specification), [online]. Version 5.0, Aug. 29, 2008, [retrieved Sep. 27, 2012]. Retrieved from the Internet: <http://eda.org/pub/ibis/ver5.0/ver5_0.pdf>, 196 pages.
Ji et al. "Evaluation of IBIS Modelling Techniques for Signal Integrity Simulations without and with Package Parasitics," Proceedings of IEEE Symposium on Electrical Design of Advanced Packaging and Systems EDAPS, 2010, pp. 1-4.
Muranyi, "Accuracy of IBIS Models with Reactive Loads," [online]. Intel, Mar. 10, 2006, [retrieved Sep. 27, 2012]. Retrieved from the Internet: <http://www.vhdl.org/pub/ibis/summits/mar06/muranyi1.pdf>, 8 pages.
Nagel, "SPICE2, A Computer Program to Simulate Semiconductor Circuits," Univ. California, Berkeley, Tech. Rep. ERL-M520, 1975, pp. 1-431.
Schutt-Ainé, "Latency Insertion Method (LIM) for the Fast Transient Simulation of Large Networks," IEEE Trans. on Circuits and Systems—I: Fundamental Theory and Applications, vol. 48, No. 1, Jan. 2001, pp. 81-89.
Tehrani et al., "Extraction of Transient Behavioral Model of Digital I/O Buffers from IBIS," Proceedings of 1996 ECTC Conference, 1996, pp. 1009-1015.
Varma et al., "Improving Behavioral IO Buffer Modeling Based on IBIS," IEEE Trans. Advanced Packaging, TADVP, vol. 31, Nov. 2008, pp. 711-721.
Wang et al. "The Development of Analog SPICE Behavioral Model Based on IBIS Model," Proceedings of the Ninth Great Lakes Symposium on VLSI, GLS '99, 1999, pp. 101-104.
Yang et al. "Enhancement of IBIS Modeling Capability in Simultaneous Switching Noise (SSN) and Other Power Integrity Related Simulations—Proposal, Implementation, and Validation," 2005 International Symposium on Electromagnetic Compatibility, EMC 2005, vol. 2, Aug. 12, 2005, pp. 672-677.
Yee, "Numerical solution of initial boundary value problems involving Maxwell's equations in isotropic media," IEEE Trans. Antennas Propagat., vol. 14, May 1966, pp. 302-307.
Zak et al. "An Experimental Procedure to Derive Reliable IBIS Models," Proceedings of the IEEE 2000 Electronics Packaging Technology Conference EPTC, 2000, pp. 339-344.

* cited by examiner

200

---

Generating, using one or more computing devices, an input/output buffer data file associated with a first model of an electrical circuit

202

Determining, using one or more computing devices, at least one of a node voltage and a branch current associated with the electrical circuit using, at least in part, a latency insertion method

204

Performing, using the one or more computing devices, one or more simulations on a second model of an electrical circuit, the one or more simulations incorporating, at least in part, the input/output buffer data file and the latency insertion method

SYSTEM, METHOD, AND COMPUTER PROGRAM PRODUCT FOR INPUT/OUTPUT BUFFER MODELING

FIELD OF THE INVENTION

The present disclosure relates to electronic design automation, and more specifically, to a method for input/output buffer modeling.

DISCUSSION OF THE RELATED ART

Electronic design automation (EDA) utilizes software tools that may be used in the design and analysis of numerous electronic systems such as printed circuit boards (PCBs) and integrated circuits (ICs). With the increase in circuit density and I/O pin count in high speed circuit systems, the simulation of large circuits such as power distribution networks (PDN) has become a serious challenge in the computer-aided design of the chip-package-board circuits.

SUMMARY OF INVENTION

In one or more embodiments of the present disclosure, a computer-implemented method for transient simulation of an input/output buffer model is provided. The method may include generating an input/output buffer data file associated with a first model of an electrical circuit. The method may also include determining at least one of a node voltage and a branch current associated with the electrical circuit using, at least in part, a latency insertion method. The method may further include performing one or more simulations on a second model of an electrical circuit, the one or more simulations incorporating, at least in part, the input/output buffer data file and the latency insertion method.

One or more of the following features may be included. In some embodiments, determining at least one coefficient may be, based upon, at least in part, the input/output buffer data file. The second model of the electrical circuit may include the at least one coefficient. In some embodiments, determining at least one of a node voltage and a branch current associated with the electrical circuit may include alternately determining the node voltage and the branch current. In some embodiments, the input/output buffer data file may be based upon, at least in part, an Input/Output Buffer Information Specification Standard. The method may further include determining at least one DC value for the second model. Determining may be performed based upon, at least in part, the latency insertion method In one or more embodiments of the present disclosure, a computer-readable storage medium for transient simulation of an input/output buffer model is provided. The computer-readable storage medium may have stored thereon instructions that when executed by a machine result in one or more operations. Operations may include generating an input/output buffer data file associated with a first model of an electrical circuit. Operations may also include determining at least one of a node voltage and a branch current associated with the electrical circuit using, at least in part, a latency insertion method. Operations may further include performing one or more simulations on a second model of an electrical circuit, the one or more simulations incorporating, at least in part, the input/output buffer data file and the latency insertion method.

One or more of the following features may be included. In some embodiments, determining at least one coefficient may be, based upon, at least in part, the input/output buffer data file. The second model of the electrical circuit may include the at least one coefficient. In some embodiments, determining at least one of a node voltage and a branch current associated with the electrical circuit may include alternately determining the node voltage and the branch current. In some embodiments, the input/output buffer data file may be based upon, at least in part, an Input/Output Buffer Information Specification Standard. Operations may further include determining at least one DC value for the second model. Determining may be performed based upon, at least in part, the latency insertion method In one or more embodiments of the present disclosure, a system may include a computing device having at least one processor configured to generate an input/output buffer data file associated with a first model of an electrical circuit. The at least one processor may be further configured to determine at least one of a node voltage and a branch current associated with the electrical circuit using, at least in part, a latency insertion method. The at least one processor may be further configured to perform one or more simulations on a second model of an electrical circuit, the one or more simulations incorporating, at least in part, the input/output buffer data file and the latency insertion method.

One or more of the following features may be included. In some embodiments, the at least one processor may be further configured to determine at least one coefficient, based upon, at least in part, the input/output buffer data file. The second model of the electrical circuit may include the at least one coefficient. In some embodiments, determining at least one of a node voltage and a branch current associated with the electrical circuit may include alternately determining the node voltage and the branch current. The input/output buffer data file may be based upon, at least in part, an Input/Output Buffer Information Specification Standard. The at least one processor may be further configured to determine at least one DC value for the second model. Determining may be performed based upon, at least in part, the latency insertion method.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 2 is a flowchart depicting operations consistent with the I/O process of the present disclosure;

DETAILED DESCRIPTION

Figure 1:
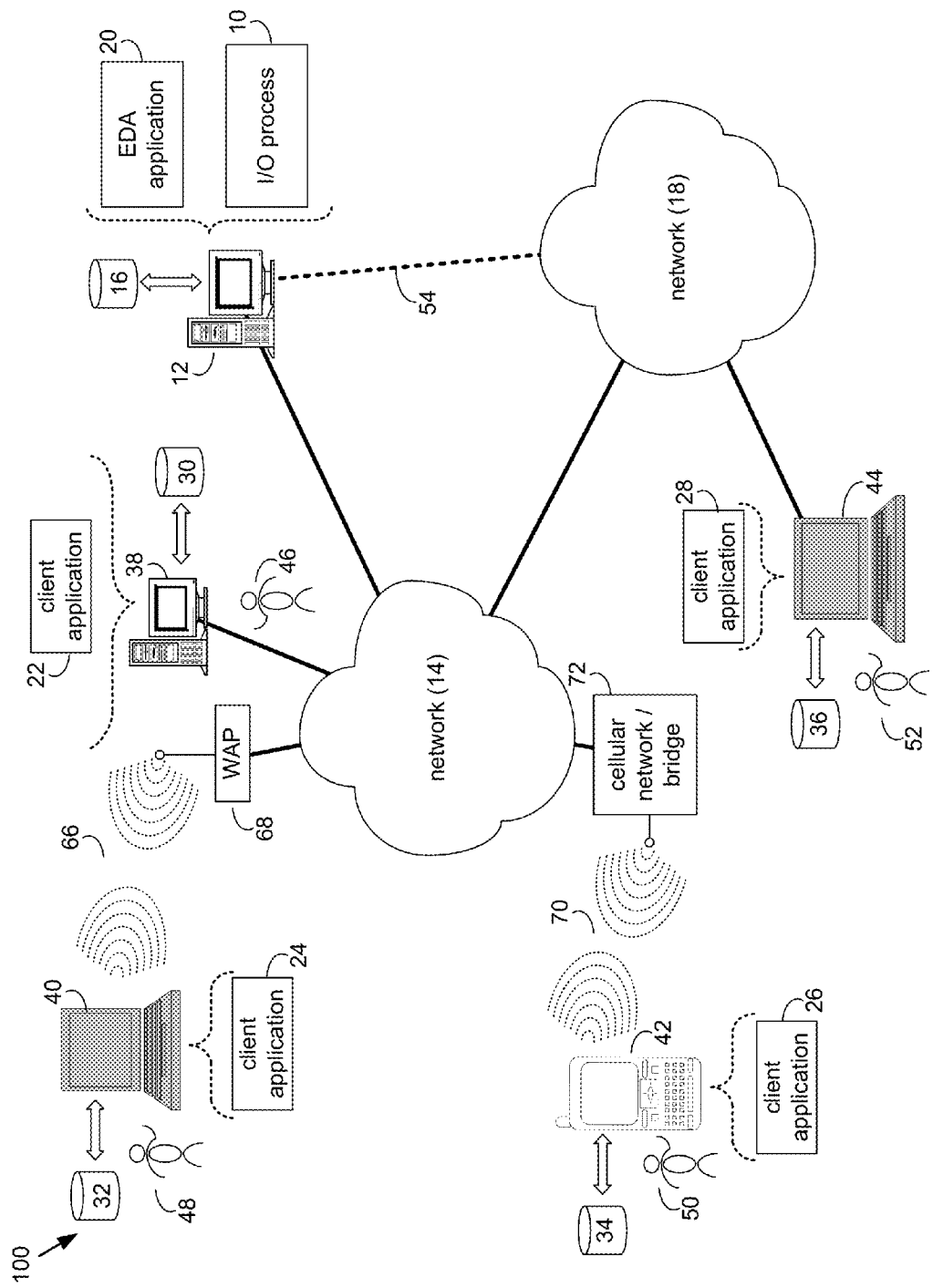
FIG. 1 is a system diagram depicting aspects of the I/O process in accordance with an embodiment of the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown I/O process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the report generation process may reside on and be executed, in whole or in part, by a client electronic device, such as a personal computer, notebook computer, personal digital assistant, or the like.

As will be discussed below in greater detail, 110 process 10 may include a method for transient simulation of an input/output buffer model. The method may include generating (202), using one or more computing devices, an input/output buffer data file associated with a first model of an electrical circuit. The method may also include determining (204), using one or more computing devices, at least one of a node voltage and a branch current associated with the electrical circuit using, at least in part, a latency insertion method. The method may further include performing (206), using the one or more computing devices, one or more simulations on a second model of an electrical circuit, the one or more simulations incorporating, at least in part, the input/output buffer data file and the latency insertion method.

The instruction sets and subroutines of I/O process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

I/O process 10 may be a stand alone application, or may be an applet/application/script that may interact with and/or be executed within EDA application 20. In addition/as an alternative to being a server-side process, the I/O process may be a client-side process (not shown) that may reside on a client electronic device (described below) and may interact with an EDA client application (e.g., one or more of EDA client applications 22, 24, 26, 28). Further, the I/O process may be a hybrid server-side/client-side process that may interact with EDA application 20 and an EDA client application (e.g., one or more of client applications 22, 24, 26, 28). As such, the I/O process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize I/O process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Embodiments described herein are directed towards an approach for the transient simulation of I/O buffers described by IBIS models. Using the latency insertion method a formulation may be obtained for the transient behavior of IBIS models and external circuitry. The I/O process described herein may offer better convergence than traditional Newton-Raphson methods and is therefore more robust.

With the trends toward higher speeds and frequency, signal integrity has become an important aspect in the design of high-speed links at the different levels of integration. Circuit designers are constantly in need of newer and better methods that are able to capture complex circuit behaviors of these networks. The ability to accurately simulate high-speed links is invaluable in the design phase. In recent years, behavioral modeling has been favored for analyzing links with active termination. This choice can be explained by the complexity of integrated circuits which makes SPICE level simulations intractable. The shift to behavioral modeling has been facilitated through the adoption of IBIS models. IBIS (Input/Output Buffer Information Specification) is an industry standard in the electronics industry also known as ANSI/EIH-656A. It was originally developed to address IP protection concerns and to simplify the simulation of complex integrated circuits while maintaining an acceptable level of accuracy. IBIS may present nonlinear data for a particular device in a tabular format. In a simulation environment, the data may be combined with neighboring circuits to form nonlinear equations for which voltage and current variables must be solved. When traditional methods are used such as the Newton-Raphson (NR) iteration scheme, convergence problems may arise and compromise the accuracy of the solution.

The Latency Insertion Method (LIM) may be used to perform fast simulations of very large circuits. In addition, LIM possesses the advantage of better convergence than NR in solving nonlinear circuit problems. By exploiting latencies in the circuit, LIM is able to solve the voltages and the currents in the circuit explicitly at each time step. This results in a computationally efficient algorithm that is able to simulate large circuits significantly faster than conventional matrix-inversion based methods. It also offers better convergence.

Figure 3:
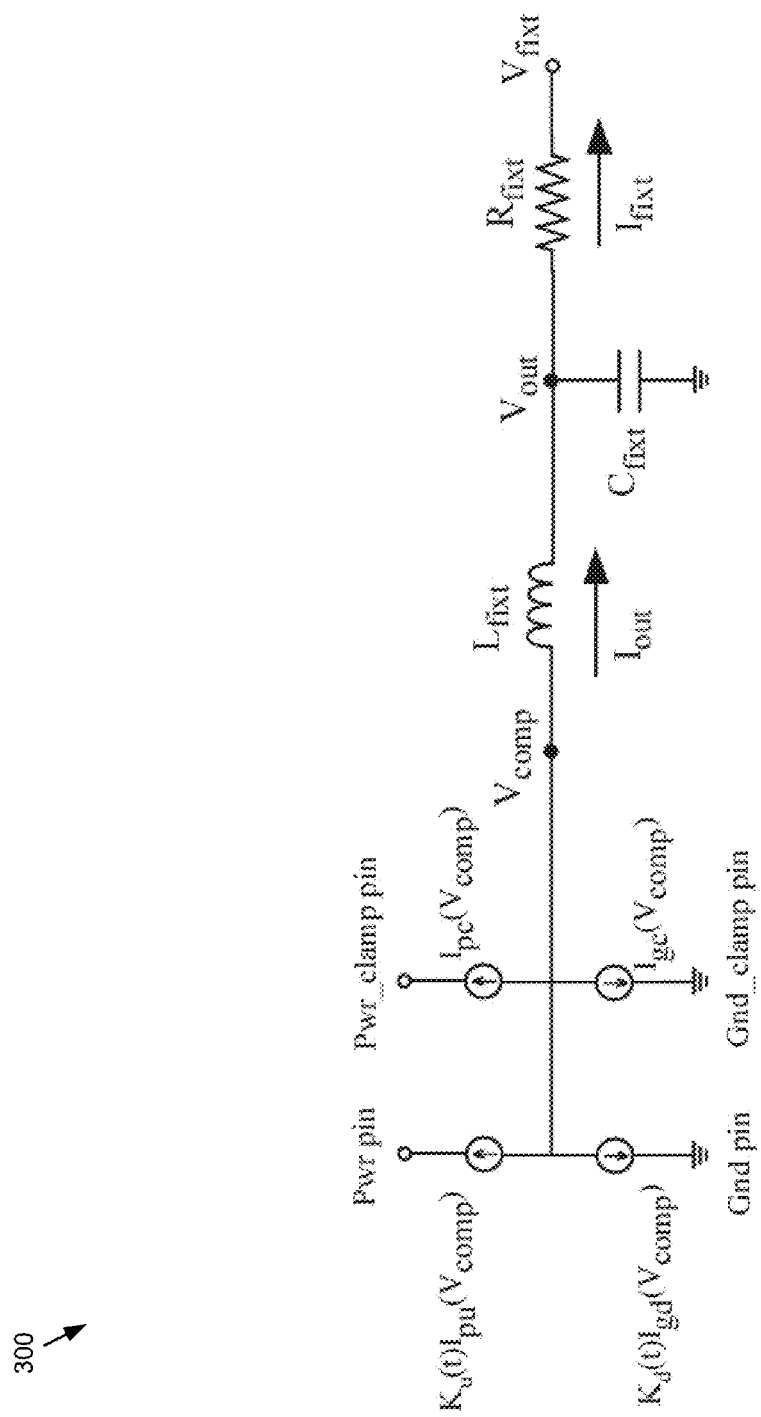
FIG. 3 is a diagram depicting aspects of the I/O process in accordance with an embodiment of the present disclosure.

Referring now to FIG. 3, a schematic 300 of an equivalent circuit used for IBIS representation is provided. Accordingly, I/O process 10 may include generating (202), using one or more computing devices, an input/output buffer data file associated with a first model of an electrical circuit. In some embodiments, the input/output buffer data file may be based upon an Input/Output Buffer Information Specification Standard. The IBIS data may be presented in any suitable format (e.g. tabular, etc.) and may be extracted and formatted using any suitable technique.

For the purpose of transient simulation, an IBIS data file may provide the following information (refer to FIG. 3). For example, the data file may include a pull-up table which contains the list of DC currents $I_{pu}$ as a function of the DC voltage $V_{comp}$ at the output as well as a pull-down table which contains the list of DC currents $I_{gd}$ as a function of the DC voltage $V_{comp}$ at the output. In some embodiments, the data file may also include a power clamp table which contains the list of DC currents $I_{pc}$ as a function of the DC voltage $V_{comp}$ at the output and a ground clamp table which contains the list of DC currents $I_{gc}$ as a function of the DC voltage $V_{comp}$ at the output. In some embodiments, the data file may include rising waveform dynamic tables which may contain transient information on the value of $V_{comp}$ as a function of time for different loading conditions of output voltage and load. The data file may also include falling waveform dynamic tables which may contain transient information on the value of $V_{comp}$ as a function of time for different loading conditions of output voltage and load.

In addition, the parameters $K_u$ and $K_d$ are factors that depend on the dynamic behavior of the devices and are used as multiplicative factors to the currents $I_{pu}$ and $I_{gd}$ respectively. They may be extracted before the simulation is performed.

Accordingly, I/O process 10 may include determining, using one or more computing devices, at least one coefficient, based upon, at least in part, the input/output buffer data file. In some embodiments, the rising and falling waveforms are also referred to as golden waveforms. These may be used to determine the coefficients $K_u$ and $K_d$ for both rising and falling cases.

Referring to FIG. 3, for a rising waveform, at a given time point t, we set $V_{out}=V_{R1}(t)$. This gives $$I_{fixt} = \frac{V_{out} - V_{fixt}}{R_{fixt}}$$

and $$I_{cap} = C_{fixt} \frac{V_{out}(t) - V_{out}(t - \Delta t)}{\Delta t}$$

where $I_{cap}$ is the current flowing through the capacitor $C_{fixt}$.

We have $I_{out}=I_{cap}+I_{fixt}$, which gives $$V_{comp} = L_{fixt} \frac{\Delta I_{out}}{\Delta t} + V_{out}$$

Using a value of $V_{comp}$, say $V_{comp1}$, we find the closest corresponding values of currents in the static IV data and set them as $I_{pd1}, I_{pu1}, I_{gc1}$ and $I_{pc1}$. We next set $V_{out2}=V_{R2}(t)$ using the same steps as above, we define another value of $V_{comp}$, say $V_{comp2}$ and find closest corresponding values of currents in static IV data and set them as $I_{pd2}, I_{pu2}, I_{gc2}$ and $I_{pc2}$. This allows us to set up a two-equation/two unknown system as $$-I_{out1}=K_u I_{pu1}+K_d I_{pd1}+I_{pc1}+I_{gc1} \quad (1)$$

$$-I_{out2}=K_u I_{pu2}+K_d I_{pd2}+I_{pc2}+I_{gc2} \quad (2)$$

Rearranging gives $$K_u I_{pu1}+K_d I_{pd1}=-I_{out1}-I_{pc1}-I_{gc1}=I_{RHS1} \quad (3)$$

$$K_u I_{pu2}+K_d I_{pd2}=-I_{out2}-I_{pc2}-I_{gc2}=I_{RHS2} \quad (4)$$

which can be written in a matrix form as:

$$\begin{bmatrix} I_{pu1} & I_{pd1} \\ I_{pu2} & I_{pd2} \end{bmatrix} \begin{bmatrix} K_u \\ K_d \end{bmatrix} = \begin{bmatrix} I_{RHS1} \\ I_{RHS2} \end{bmatrix} \quad (5)$$

For each time step, we solve for $K_u$ and $K_d$ by inverting the matrix equation (5). This gives us $K_u(t)$ and $K_d(t)$ for the rising waveform. A similar approach will yield $K_u(t)$ and $K_d(t)$ for the falling waveform.

Figure 4:
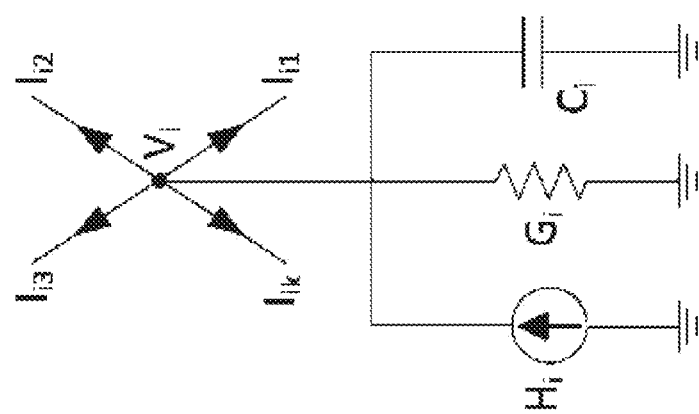
FIG. 4 is a diagram depicting an example of a report generated in accordance with an embodiment of the present disclosure.
Figure 5:
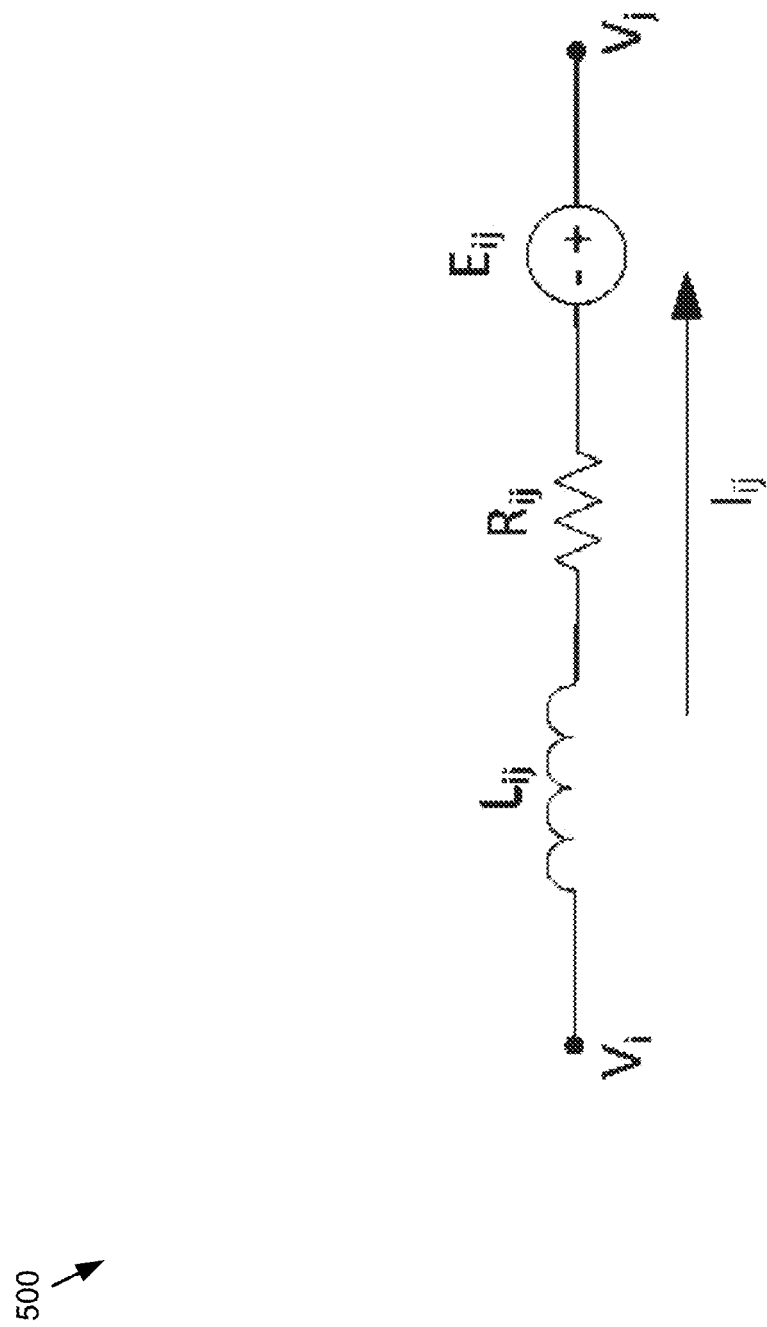
FIG. 5 is a diagram depicting aspects of the I/O process in accordance with an embodiment of the present disclosure.

I/O process 10 may include determining (204), using one or more computing devices, at least one of a node voltage and a branch current associated with the electrical circuit using, at least in part, a latency insertion method. LIM can be applied to any arbitrary network, where it is assumed that through the use of Thévenin and Norton transformations, the branches and nodes of the circuit may be described by the general topologies shown in FIG. 4 and FIG. 5. Each node is represented by a parallel combination of a current source, a conductance, and a capacitor to ground. The connection between two different nodes forms a branch and it is represented by a series combination of a voltage source, a resistor and an inductor. In order to solve for the voltages and currents in the circuit, LIM may discretize the time variable whereby the voltages and currents are collated in half time steps.

Specifically, the voltages may be solved at half time steps while the currents may be solved at full time steps. From FIG. 4, writing Kirchhoff's current law (KCL) at node i yields $$C_i\left(\frac{V_i^{n+\frac{1}{2}} - V_i^{n-\frac{1}{2}}}{\Delta t}\right) + G_i V_i^{n+\frac{1}{2}} - H_i^n = -\sum_{K=1}^{M_i} I_{ik}^n \quad (6)$$

where the superscript n is the index of the current time step, $\Delta t$ is the time step and $M_i$ is the number of branches connected to node i. Solving for the unknown voltage yields $$V_i^{n+1/2} = \frac{\frac{C_i V_i^{n-1/2}}{\Delta t} + H_i^n - \sum_{k=1}^{M_i} I_{ik}^n}{\frac{C_i}{\Delta t} + G_i} \quad (7)$$

for $i=1, 2, \ldots, N_n$ where $N_n$ is the number of nodes in the circuit. From FIG. 4, writing Kirchhoff's voltage law (KVL) at branch ij yields $$V_i^{n+1/2} - V_j^{n+1/2} = L_{ij}\left(\frac{I_{ij}^{n+1} - I_{ij}^n}{\Delta t}\right) + R_{ij}I_{ij}^n - E_{ij}^{n+1/2} \quad (8)$$

Solving for the unknown current yields $$I_{ij}^{n+1} = I_{ij}^n + \frac{\Delta t}{L_{ij}}(V_i^{n+1/2} - V_j^{n+1/2} - R_{ij}I_{ij}^n - E_{ij}^{n+1/2}) \quad (9)$$

The computation of the node voltages and the branch currents may be alternated as time progresses in a leapfrog manner. Accordingly, determining at least one of a node voltage and a branch current associated with the electrical circuit may include alternately determining the node voltage and the branch current. The LIM algorithm relies on the latencies in the network to perform the leapfrog time stepping formulation. Thus, at every node, a capacitor to ground may be present. If it is not, a small fictitious capacitor may be inserted. Similarly, small fictitious inductors are inserted into branches without latencies.

Once $K_u$ and $K_d$ for the IBIS model are obtained, simulations may be performed using a different circuit or model. New elements in FIG. 6, $C_{comp}$, $G_{comp}$, $R_{pkg}$, $L_{pkg}$, $C_{ext}$ and $G_{ext}$ are introduced as shown. We need to determine $V_{comp}$ and other voltages and currents for rising and falling pulses.

Figure 6:
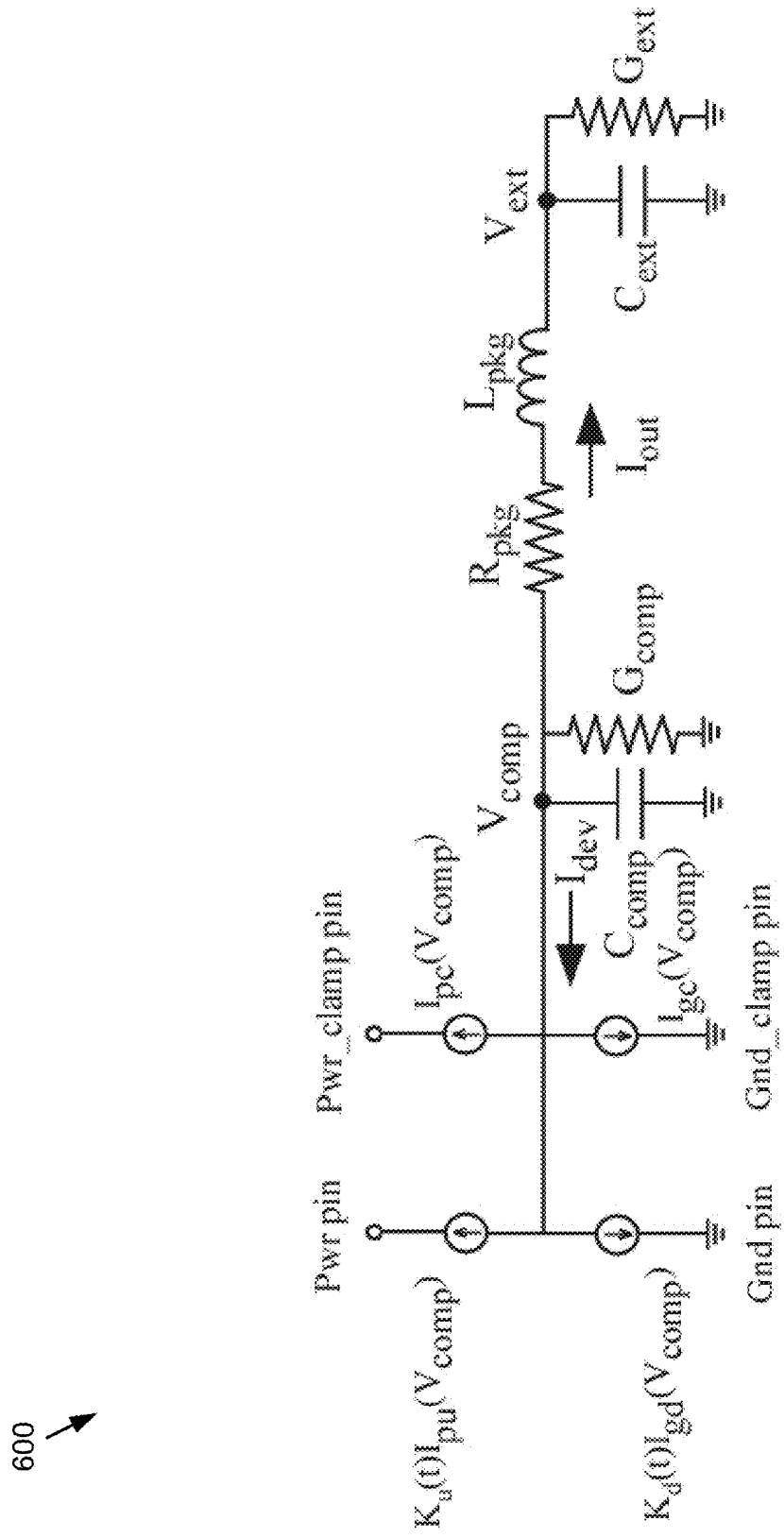
FIG. 6 is a diagram depicting aspects of the I/O process in accordance with an embodiment of the present disclosure.

Referring to FIG. 6, for the external circuit, a LIM formulation gives $$C_{ext}\frac{(V_{ext}^{n+1/2} - V_{ext}^{n-1/2})}{\Delta t} + \frac{G_{ext}}{2}(V_{ext}^{n+1/2} + V_{ext}^{n-1/2}) = I_{out}^n \quad (10)$$

which leads to:

$$V_{ext}^{n+1/2} = \frac{I_{out}^n + \left(\frac{C_{ext}}{\Delta t} - \frac{G_{ext}}{2}\right)V_{ext}^{n-1/2}}{\left(\frac{C_{ext}}{\Delta t} + \frac{G_{ext}}{2}\right)} \quad (11)$$

For the branch equation, we have:

$$V_{comp}^{n+1/2} - V_{ext}^{n+1/2} = L_{pkg}\frac{(I_{out}^{n+1} - I_{out}^n)}{\Delta t} + \frac{R_{pkg}}{2}(I_{out}^{n+1} + I_{out}^n) \quad (12)$$

which leads to:

$$I_{out}^{n+1} = \frac{(V_{comp}^{n+1/2} - V_{ext}^{n+1/2}) + I_{out}^n\left(\frac{L_{pkg}}{\Delta t} - \frac{R_{pkg}}{2}\right)}{\left(\frac{L_{pkg}}{\Delta t} + \frac{R_{pkg}}{2}\right)} \quad (13)$$

We now observe that $V_{comp}$ satisfies the relation:

$$C_{comp}\frac{(V_{comp}^{n+1/2} - V_{comp}^{n-1/2})}{\Delta t} + \frac{G_{comp}}{2}(V_{comp}^{n+1/2} + V_{comp}^{n-1/2}) = -I_{out}^n - I_{dev}^n \quad (14)$$

which gives $$V_{comp}^{n+1/2} = \frac{-I_{out}^n - I_{dev}^n + \left(\frac{C_{comp}}{\Delta t} - \frac{G_{comp}}{2}\right)V_{comp}^{n-1/2}}{\left(\frac{C_{comp}}{\Delta t} + \frac{G_{comp}}{2}\right)} \quad (15)$$

where $I_{dev}^n$ is evaluated as:

$$I_{dev}^n = K_u I_{pu}(V_{comp}) + K_d I_{pd}(V_{comp}) + I_{pc}(V_{comp}) + I_{gc}(V_{comp}) \quad (16)$$

from the static IV curves and using the current values of $K_u$ and $K_d$. The LIM simulation proceeds by leapfrogging between the voltage and current equations.

I/O process 10 may further include performing (206), using the one or more computing devices, one or more simulations on a second model of an electrical circuit, the one or more simulations incorporating, at least in part, the input/output buffer data file and the latency insertion method. As discussed herein, the second model of the electrical circuit may include the at least one coefficient.

I/O process 10 may further include determining at least one DC value for the second model. For example, I/O process 10 may determine DC values for $V_{ext}$, $V_{comp}$ and $I_{out}$. I/O process 10 may also include setting time t and calculating $V_{ext}$ as per equation (11). I/O process 10 may use $K_u(t)$ and $K_d(t)$ from previously extracted tables and evaluate $I_{dev}$ using Equation (5). I/O process 10 may then calculate $V_{comp}$ using Equation (15) and calculate $I_{out}$ using Equation (13).

In some embodiments, determining at least one DC value may be performed based upon, at least in part, the latency insertion method. This is discussed in further detail below. In order for the LIM solution to be accurate, the initial condition or DC values must be properly determined. In order to do so, a separate LIM transient simulation must be performed using a step function (with finite risetime) and arbitrary reactive elements in the nodes and branches. The magnitude of the step function may be predicated by the values of the initial $K_u$ and $K_d$ functions. When the response has settled, the final values are the DC solutions.

The algorithms described may be implemented in any suitable language (e.g., a C program) to perform transient simulations. In parallel, another routine using the Newton-Raphson iteration method was used in order to study the convergence properties in comparison with LIM. An IBIS file for a CMOS buffer circuit was used for the simulations.

The superior convergence property of the LIM method is due to the fact that with the added latency, no iteration in solving the nonlinear voltage-current problem is needed. As long as the time step is sufficiently small, an explicit solution for the voltage and current variables can be found with enough accuracy that can be guaranteed by the LIM algorithm.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for transient simulation of an input/output buffer model comprising:
    generating, using one or more computing devices, an input/output buffer data file associated with a first Input/Output Buffer Information model of a first electrical circuit;
    determining, using one or more computing devices, a node voltage and a branch current associated with the first electrical circuit using, at least in part, a latency insertion method, wherein determining a node voltage and a branch current associated with the first electrical circuit includes alternately computing the node voltage and the branch current as time progresses in a leapfrog manner using a leapfrog time stepping formulation; and
    performing, using the one or more computing devices, one or more simulations on a second Input/Output Buffer Information model of a second electrical circuit, the one or more simulations on the second electrical circuit incorporating, at least in part, at least one coefficient determined from the input/output buffer data file of the first electrical circuit and the latency insertion method, wherein the first electrical circuit and the second electrical circuit are different.

2. The computer-implemented method of claim 1, further comprising:
    determining, using one or more computing devices, the at least one coefficient, based upon, at least in part, the input/output buffer data file.

3. The computer-implemented method of claim 2, wherein the second Input/Output Buffer Information model of the second electrical circuit includes the at least one coefficient.

4. The computer-implemented method of claim 1, wherein the input/output buffer data file is based upon, at least in part, an Input/Output Buffer Information Specification Standard.

5. The computer-implemented method of claim 1, further comprising:
    determining at least one DC value for the second model.

6. A non-transitory computer-readable storage medium for transient simulation of an input/output buffer model, the computer-readable storage medium having stored thereon instructions that when executed by a machine result in the following operations:
    generating, using one or more computing devices, an input/output buffer data file associated with a first Input/Output Buffer Information model of a first electrical circuit;
    determining, using one or more computing devices, a node voltage and a branch current associated with the first electrical circuit using, at least in part, a latency insertion method, wherein determining a node voltage and a branch current associated with the first electrical circuit includes alternately computing the node voltage and the branch current as time progresses in a leapfrog manner using a leapfrog time stepping formulation; and
    performing, using the one or more computing devices, one or more simulations on a second Input/Output Buffer Information model of a second electrical circuit, the one or more simulations on the second electrical circuit incorporating, at least in part, at least one coefficient determined from the input/output buffer data file of the first electrical circuit and the latency insertion method, wherein the first electrical circuit and the second electrical circuit are different.

7. The computer-readable storage medium of claim 6, wherein operations further comprise:
    determining, using one or more computing devices, the at least one coefficient, based upon, at least in part, the input/output buffer data file.

8. The computer-readable storage medium of claim 7, wherein the second Input/Output Buffer Information model of the second electrical circuit includes the at least one coefficient.

9. The computer-readable storage medium of claim 6, wherein the input/output buffer data file is based upon, at least in part, an Input/Output Buffer Information Specification Standard.

10. The computer-readable storage medium of claim 6, wherein operations further comprise: determining at least one DC value for the second model.

11. A system for input/output buffer modeling comprising:
a computing device having at least one processor configured to generate an input/output buffer data file associated with a first Input/Output Buffer Information model of a first electrical circuit, the at least one processor further configured to determine a node voltage and a branch current associated with the first electrical circuit using, at least in part, a latency insertion method, wherein determining a node voltage and a branch current associated with the first electrical circuit includes alternately computing the node voltage and the branch current as time progresses in a leapfrog manner using a leapfrog time stepping formulation, the at least one processor further configured to perform one or more simulations on a second Input/Output Buffer Information model of a second electrical circuit, the one or more simulations on the second electrical circuit incorporating, at least in part, at least one coefficient determined from the input/output buffer data file of the first electrical circuit and the latency insertion method, wherein the first electrical circuit and the second electrical circuit are different.

12. The system of claim 11, wherein the at least one processor is further configured to determine the at least one coefficient, based upon, at least in part, the input/output buffer data file.

13. The system of claim 12, wherein the second Input/Output Buffer Information model of the second electrical circuit includes the at least one coefficient.

14. The system of claim 11, wherein the input/output buffer data file is based upon, at least in part, an Input/Output Buffer Information Specification Standard.

15. The system of claim 14, wherein the at least one processor is further configured to determine at least one DC value for the second model.

* * * * *